United States Patent Office 3,235,532
Patented Feb. 15, 1966

3,235,532
POLYOLEFINS STABILIZED BY A COMBINATION OF BORIC ACID, PHENOLIC COMPOUNDS, AND SULFUR CONTAINING COMPOUNDS
Jack R. Hopper, Newark, Del., and Eugene E. Poirot and Raymond A. Speed, Baytown, Tex., assignors, by mesne assignments, to Esso Research and Engineering Company, Elizabeth, N.J., a corporation of Delaware
No Drawing. Filed Dec. 8, 1961, Ser. No. 158,129
9 Claims. (Cl. 260—45.95)

The present invention is directed to an improved composition including a polyolefin. More particularly, the invention is concerned with a polyolefin composition which has improved oxidative stability and color. In its more specific aspects, the invention is directed to a polypropylene composition which has been stabilized against degradation caused by oxidation and against color instability.

The present invention may be briefly described as a polyolefin composition such as polypropylene which contains a major amount of a solid polymer of an alpha olefin having 2 to 8 carbon atoms in the molecule and a minor amount of boric acid. It is contemplated that the composition of the present invention may contain a phenolic inhibitor and a costabilizer.

In the practice of the present invention, the boric acid may be employed in an amount within the range from about 0.01 to about 1.0 percent by weight of the solid polymer. An amount within the range from about 0.1 to about 0.5 percent by weight may be preferred.

The phenolic type inhibitor may be illustrated by compounds such as dipinene diphenol and other stabilizers such as exemplified by $\alpha^2,\alpha^6$-bis(3-t-butyl-5-methyl-2-hydroxyphenyl)mesitol, 2,6-di-t-butyl-4-methylphenol, 4,4'-thiobis-(3-methyl-6-t-butylphenol), 4,4'-(1,1-butylidene)bis-(3-methyl-6-t-butylphenol), 2,6-bis($\alpha$-phenethyl)-4-methylphenol, 2,6-bis(1,1-dimethyl-n-octyl)-4-methylphenol, 2,2'-methylenebis-(4-methyl-6-t-butylphenol), and 4,4'-methylenebis-(2,6-di-t-butylphenol).

The amount of the phenolic inhibitor may be an amount within the range from about 0.01 to about 1.0 percent by weight of the composition and an amount within the range from about 0.01 to about 0.5 percent by weight may be preferred.

It is also desirable in the practice of the present invention to employ a sulfur-containing costabilizer such as illustrated by the dialkyl sulfides having 12 to 30 carbon atoms in the molecule of which illustrative members are dioctadecyl sulfide, didocosyl sulfide, diheptadecyl sulfide, ditricosyl sulfide, dipentadecyl sulfide, ditetracosyl sulfide, dinonadecyl sulfide, dipentacosyl sulfide, dieicosyl sulfide, dihexacosyl sulfide, diheneicosyl sulfide, and diheptacosyl sulfide. Other sulfur-containing compounds may be used, of which dilaurylthiodipropionate is preferred. Other sulfur-containing compounds such as distearylthiodipropionate, 19,25-dithiohentetracontane, 19,24-dithiotetracontane, bis(octadecylmercapto)-p-xylylene and bis(tetradecylmercapto)-p-xylylene may be employed.

The dipinene diphenol employed in the composition is a resinous material with the pinene and phenol being present in a ratio of about 1:1. The dipinene diphenol has a molecular weight in the range from about 450 to about 550 and may be represented by the formula: $(C_{10}H_{16})_2 (C_6H_5OH)_2$. The dipinene diphenol is produced by reacting 1 mol of pinene and 1 mol of phenol in the presence of boron trifluoride etherate as a catalyst at a temperature from about 70° to about 122° F. to form the resinous dipinene diphenol product. In preparing the dipinene diphenol, a mixture of alpha and beta pinene in a benzene solution of phenol is reacted. The product is washed with hot water to remove catalyst and unreacted material. Thereafter, the washed product is dried, filtered, and then distilled to remove benzene and any light fraction. The material remaining is the dipinene diphenol. The dipinene diphenol has a ring and ball melting point in the range from about 75° to about 150° C. and is completely soluble in methanol.

The polyolefin polymers employed in the practice of the present invention are polymers of olefins having 2 to 8 carbon atoms in the molecule and may suitably be exemplified by polyethylene, polypropylene, ethylene-propylene copolymers, ethylene-butene-1 copolymers, ethylene-pentene-1 copolymers and the like having molecular weights in the range from about 10,000 to about 1,000,000. These polymers are produced by polymerization of the corresponding olefins employing the Ziegler type polymerization catalyst which is obtained by at least partially reducing in solution in a diluent a halide of an amphoteric metal selected from Groups IV–B, V–B, VI–B and VIII of the Periodic System of Elements, such as the Henry D. Hubbard Periodic Chart of the Elements, 1947, Ed., revised by W. F. Meegers, W. M. Welch Mfg. Co., Chicago, Ill. Examples of suitable halides from which the catalyst is prepared are the halides of titanium, zirconium, hafnium, thorium, uranium, vanadium, columbium, tantalum, chromium, molybdenum, tungsten and mixtures thereof. Exemplary of suitable compounds include titanium tetrachloride, titanium tetrabromide, zirconium tetrachloride and the like.

In preparing catalysts suitable for use in forming the polymer treated in accordance with the present invention, the amphoteric metal halide is reduced in solution in a nonreactive, nonpolar organic diluent in any suitable manner such as by means of chemical reaction with a suitable chemical compound having reduction properties, by irradiation, and the like. This is done to reduce at least a portion, and preferably more than about 30 percent, of the amphoteric metal halide to a lower valence state. The product of the reaction step comprising the diluent and the at least partially reduced amphoteric metal halide is employed as a medium in which olefin polymerization is effected.

The diluent to be employed should be a nonreactive, nonpolar organic medium in which the amphoteric metal halide starting material is soluble to an extent at least sufficient to provide a 0.1 weight percent solution of amphoteric metal halide starting material. Thus, for example, in preparing the polymerization medium, a 0.1 to 10 weight percent solution of amphoteric metal halide in the diluent may be employed.

Among the diluents that may be employed are saturated aliphatic hydrocarbons preferably containing from about 5 to 10 carbon atoms per molecule. Specific examples of such diluents include pentane, hexane, heptane, octane, decane, nonane and mixtures thereof or other saturated petroleum hydrocarbons. A particularly desirable diluent is n-heptane. It will be understood that other hydrocarbon diluents may be used such as aromatic hydrocarbon diluents as exemplified by benzene, xylene and the like; halogenated hydrocarbons such as monochlorobenzene, dichlorobenzene and the like; gas oil distillate fractions obtained from the catalytic cracking or vis-breaking of gas oil feed stock; diesel oil; and the other similar hydrocarbon fractions. It will be understood that, if desired, mixtures of two or more compatible miscible diluents may be employed. The diluents should be substantially completely free from oxygen, water and similar compounds of strong polarity which are reactive with the products obtained by reduction of the amphoteric metal halide.

The nonpolar organic liquid in which the slurry is formed may suitably be identical with the diluent in which the catalyst is formed for polymerization of the olefinic hydrocarbons.

The polymerization reaction is suitably conducted at temperatures in the range from about —60° to about 400° F., preferably at about room temperature. Higher temperatures may be employed but are generally undesirable in that catalyst decomposition may be encountered. Subatmospheric pressures and pressures up to about 250 atmospheres may be employed in forming the polymer which is produced in accordance with the present invention. It is generally preferable to employ in the polymerization technique a comparatively low pressure and specifically it is desirable to employ atmospheric pressure. Reaction times may vary within the range from about 10 minutes to about 24 hours.

As a result of subjecting the olefins of the type illustrated before to treatment with the catalyst of the nature described, olefin polymers are formed having the molecular weights recited which are essentially insoluble in the nonpolar organic liquid and form a slurry of polymerized olefins in the nonpolar organic liquid. These polymers are quenched to deactivate any catalyst by adding methanol and the like thereto, and additional quantities of methanol may be added to the slurry to allow separation of the polymer particles. The polymer particles, after separation from the slurry, are treated by adding the several compounds therto. Thus, the phenolic inhibitor, the sulfur-containing costabilizer and the boric acid may be added severally or together to the polymer particles. Since the polymer particles as recovered from the slurry are in a finely divided state, they have a high surface area and rapidly adsorb oxygen. It is, therefore, desirable in accordance with the present invention to add the boric acid, the phenolic inhibitor and the sulfur-containing costabilizer thereto to prevent color degradation and to impart oxidative stability to the composition.

The boric acid may be suitably added to the polymer by blending the finely divided boric acid powder with the polymer pellets and then the blend is extruded to provide dispersion. The boric acid powder may suitably have particle sizes within the range from about 5 to about 500 microns. Dry boric acid crystals may be added to the dry polymers powder or aqueous solutions of boric acid may be added to the dry polymer powder and the mixture worked or extruded to form a homogeneous mixture or composition.

In adding the phenolic inhibitor and the sulfur-containing costabilizer to the solid polymer, these materials may suitably be employed and incorporated in the solid polymer by forming a solution of the particular additives in a suitable solvent such as, for example, an aromatic hydrocarbon, a low boiling ether such as diethyl ether, an aliphatic alcohol such as methanol, or by dissolving the phenolic inhibitor and the sulfur-containing costabilizer in a solvent such as xylene, hexane and the like. The phenolic inhibitor and the sulfur-containing costabilizer may be sprayed over pellets or particles of the polymer and the resulting mixture may then be extruded through a suitable extrusion device to cause formation of a homogeneous mixture. While it is preferred to add the phenolic inhibitor and the sulfur-containing costabilizer as a solution, these materials may suitably be added as such to the polymer particles and the resulting mixture subjected to milling and/or extrusion as desired to cause intimate admixture of the two materials with the polymer composition to form a homogeneous mixture. While extrusion and milling have been described as modes of incorporating not only the boric acid but also the phenolic inhibitor and sulfur-containing costabilizer into the polymer, other means may suitably be employed so long as the boric acid, particularly, and the phenolic inhibitor and the sulfur-containing costabilizer are thoroughly distributed throughout and admixed with the polymer.

The composition of the present invention is quite important and useful in formation of products such as molded and extruded devices and articles; or the polyolefin composition after suitable addition of the dialkyl sulfide and the phenolic costabilizer may be formed into films for use in wrapping foodstuffs and other articles; or the polymer composition may be extruded as a filament to be used in weaving and forming of cloth, fibers and other similar materials.

In order to illustrate the practice of the present invention, a number of compositions were made up in which Ionol (2,6-di-t-butyl-4-methyl phenol), dilaurylthiodipropionate and boric acid were added to polypropylene. Other compositions were made up containing the Ionol and the dilaurylthiodipropionate (DLTDP) without the boric acid and were subjected to oxidative stability tests for a period of time employing in one instance oxygen and in another instance air. The conditions and results of these operations are set out in the following table.

TABLE I

| Sample | Additives, Wt. percent | | | Oxidative Stability | |
|---|---|---|---|---|---|
| | Ionol | DLTDP* | $H_3BO_3$ | $O_2$ at 315° F., Hrs. | Air at 300° F., Days |
| Polypropylene | 0.13 | 0.16 | | 2 | <½ |
| Do | 0.13 | 0.16 | 0.30 | 17 | 6 |
| Do | 0.13 | 0.16 | 0.03 | 12 | |

*Dilaurylthiodipropionate.

By way of explanation, numerous tests on the Ionol-dilaurylthiodipropionate system show that severe oxidation occurs after about one day in air at 300° F. The stability of six days obtained when 0.3 percent boric acid was added therefore represents a very significant improvement for this stabilizer system.

In the foregoing examples, the boric acid was added to the polypropylene by blending the finely divided boric acid powder having particle sizes within the range from 5 to 500 microns with the polymer pellets and then extruding the mixture to provide dispersion.

Polyolefins, such as polypropylene, sometimes exhibit poor color which may be caused by the presence of metal contaminants such as catalyst residues including titanium and aluminum, iron, nickel, copper and the like. The use of polyolefins, such as polypropylene, as electrical insulators results in contamination of the polypropylene with copper which causes degradation of the polypropylene. In accordance with the present invention, this color degradation is suppressed or completely eliminated by adding the boric acid to the polyolefin. Boric acid prevents color degradation even when good color polymer is heated to approximately 550° F. during molding operations. The color degradation may occur even when the polymer has been inhibited with an oxidative stabilizer system comprising Ionol and dilaurylthiodipropionate and other stabilizer systems such as Ionol, dilaurylthiodipropionate and Argus-D or Argus-G (commercially available products of the Argus Chemical Corporation).

In order to illustrate the effect of boric acid on these compositions, especially when high concentrations of iron are present, compositions were made up of polypropylene to which had been added Ionol, dilaurylthiopropionate, ferric chloride and boric acid, following which the compositions were rated for color. These results are shown in Table II.

TABLE II

| Sample | Additives, Wt. Percent | | | | Color Rating |
|---|---|---|---|---|---|
| | Ionol | DLTDP* | FeCl$_3$ | H$_3$BO$_3$ | |
| Polypropylene | 0.10 | 0.25 | 0.003 | | 6 (Tan). |
| Do | 0.10 | 0.25 | 0.003 | 0.10 | 2+ (Clear White). |

*Dilaurylthiodipropionate.

In the foregoing tests, iron chloride was added to insure a poor starting material. Operations have been conducted, however, where color improvement has been obtained by adding boric acid to polypropylene in the absence of added iron or other metals.

In order to illustrate the effect on color degradation suffered during molding operations at 550° F., polypropylene compositions were made up which contained in some instances boric acid and in other instances only the phenolic inhibitor and the sulfur-containing costabilizer. The results of these tests are shown in Table III.

TABLE III

| Sample | Additives, Wt. Percent | | | Color of Molded Pad |
|---|---|---|---|---|
| | Ionol | DLTDP* | H$_3$BO$_3$ | |
| Prolypropylene | 0.13 | 0.16 | | Blue-gray. |
| Do | 0.13 | 0.16 | 0.30 | White. |
| Do | 0.10 | 0.25 | | Blue-gray. |
| Do | 0.10 | 0.25 | 0.10 | White. |
| Do | 0.10 | 0.25 | | Light gray. |
| Do | 0.10 | 0.25 | 0.05 | White. |

*Dilaurylthiodipropionate.

It will be seen from the foregoing results in Table III that an improvement in color is obtained even where the polymer is not contaminated with metallic contaminants other than possibly traces of catalyst residues. It is to be noted that only small amounts of the boric acid are necessary, and the data indicates that approximately 0.05 weight percent may be sufficient.

The nature and objects of the present invention having been completely described and illustrated and the best mode thereof set forth, what we wish to claim as new and useful and secure by Letters Patent is:

1. A composition having improved oxidative stability and color which comprises a solid polymer of an alpha mono-olefin, having 2 to 8 carbon atoms in the molecule containing a contaminating amount of copper and effective amounts within the range from about 0.01% to about 1.0% by weight of a phenolic inhibitor selected from the group consisting of dipinene diphenol, $\alpha^2$, $\alpha^6$-bis (3 - t - butyl - 5 - methyl - 2 - hydroxyphenyl) mesitol, 2,6-di-t-butyl-4-methylphenol, 4,4'-thiobis-(3-methyl-6-t-butylphenol), 4,4' - (1,1 - butylidene) bis - (3 - methyl-6 - t - butylphenol), 2,6 - bis($\alpha$ - phenethyl) - 4 - methylphenol, 2,6 - bis(1,1 - dimethyl - n - octyl) - 4 - methylphenol, 2,2'-methylenebis-(4-methyl-6-t-butylphenol), and 4,4'-methylenebis-(2,6-di-t-butylphenol); a sulfur-containing costabilizer selected from the group consisting of dialkyl sulfides having 12 to 30 carbon atoms in the molecule, distearylthiodipropionate, dilaurylthiodipropionate, 19,25-dithiohentetetracontane, 19,25-dithiotetracontane, bis(octadecylmercapto)-p-xylylene, and bis(tetradecylmercapto)-p-xylylene; and boric acid.

2. A composition in accordance with claim 1 in which the solid polymer is polyethylene.

3. A composition in accordance with claim 1 in which the solid polymer is polypropylene.

4. An article comprising polypropylene in contact with copper, said polypropylene containing effective amounts within the range from about 0.01% to about 1.0% by weight of a phenolic inhibitor selected from the group consisting of dipinene diphenol, $\alpha^2$, $\alpha^6$-bis(3-t-butyl-5 - methyl - 2 - hydroxyphenyl)mesitol, 2,6 - di - t - butyl-4 - methylphenol, 4,4' - thiobis - (3 - methyl - 6 - t - butylphenol), 4,4' - (1,1 - butylidene)bis - (3 - methyl - 6 -.t-butylphenol), 2,6-bis($\alpha$-phenethyl)-4-methylphenol, 2,6-bis(1,1-dimethyl-n-octyl)-4-methylphenol, 2,2'-methylene-bis-(4-methyl-6-t-butylphenol), and 4,4'-methylenebis-(2,6-di-t-butylphenol); a sulfur-containing costabilizer selected from the group consisting of dialkyl sulfides having 12 to 30 carbon atoms in the molecule, distearylthiodipropionate, dilaurylthiodipropionate, 19,25-dithiohentetetracontane, 19,24-dithiotetracontane, bis(octadecylmercapto) - p - xylylene, and bis(tetradecylmercapto)p-xylylene; and boric acid.

5. A composition having improved oxidative stability and color which comprises a solid polymer of an alpha mono-olefin having 2 to 8 carbon atoms containing a contaminating amount of copper and effective amounts of 2,6-ditertiarybutyl-4-methyl phenol, dilaurylthiodipropionate, and boric acid within the range from about 0.01% to about 1.0% by weight.

6. A composition in accordance with claim 5 in which the polymer is polypropylene.

7. A composition having improved oxidative stability and color which comprises a solid polymer of an alpha mono-olefin having 2 to 8 carbon atoms containing a contaminating amount of copper and effective amounts of dipinene diphenol, dilaurylthiodipropionate, and boric acid within the range from about 0.01% to about 1.0% by weight.

8. A composition in accordance with claim 7 in which the polymer is polypropylene.

9. A composition having improved oxidative stability and color which comprises a solid polymer of an alpha mono-olefin having 2 to 8 carbon atoms containing a contaminating amount of copper and effective amounts of dipinene diphenol, a dialkyl sulfide having 12 to 30 carbon atoms in the molecule, and boric acid within the range from about 0.01% to about 1.0% by weight.

References Cited by the Examiner

UNITED STATES PATENTS

| 2,537,636 | 1/1957 | Kitchen | 260—45.95 |
| 2,985,617 | 5/1961 | Salyer | 260—45.7 |
| 3,053,802 | 9/1962 | Piacente | 260—41 |
| 3,082,192 | 3/1963 | Kirshenbaum | 260—88.2 |

FOREIGN PATENTS

| 1,248,217 | 10/1960 | France. |
| 864,103 | 3/1961 | Great Britain. |

OTHER REFERENCES

Raff et al., "Polyethylene," Interscience, New York, 1956, pages 103–108.

LEON J. BORCOVITZ, *Primary Examiner.*

ALPHONSO D. SULLIVAN, JOSEPH LIBERMAN, *Examiners.*